United States Patent [19]
Mizuno

[11] Patent Number: 5,234,176

[45] Date of Patent: Aug. 10, 1993

[54] PHOTOGRAPHIC FILM CASSETTE WITH LIGHT-TRAPPING MEMBERS AND METHOD FOR TREATING LIGHT-TRAPPING MEMBERS

[75] Inventor: Kazunori Mizuno, Kanagawa, Japan

[73] Assignee: Fuji Photo Film Co., Ltd., Kanagawa, Japan

[21] Appl. No.: 889,436

[22] Filed: May 28, 1992

[30] Foreign Application Priority Data

May 28, 1991 [JP] Japan ................... 3-154120

[51] Int. Cl.$^5$ .............................................. G03B 17/26
[52] U.S. Cl. ................... 242/71.1; 354/275; 156/72; 156/293; 156/294
[58] Field of Search ................ 242/71.1, 71.7; 354/275; 29/419.1; 156/72, 148, 293, 294

[56] References Cited

U.S. PATENT DOCUMENTS 4,875,637 10/1989 Beach ................... 242/71.1

FOREIGN PATENT DOCUMENTS 0421097 4/1991 European Pat. Off. .
0440240 8/1991 European Pat. Off. .

*Primary Examiner*—John M. Jillions
*Attorney, Agent, or Firm*—Sughrue, Mion, Zinn, Macpeak & Seas

[57] ABSTRACT

A photographic film cassette containing of a photographic film whose leading end is initially positioned in a cassette shell and advanced through a film passageway out of the cassette shell by rotation of a spool. Light-trapping members are attached to upper and lower surfaces of the film passageway. After assembling the photographic film cassette, and before loading it into a camera, the leading end is advanced through the film passageway out of the cassette shell and returned to an inside of the cassette shell so that tips of piles of the light-trapping members are arranged so as to push against each other with tips thereof inclined in a film moving direction. In a preferred embodiment, a sheet member is inserted into and drawn from a film passageway to arrange the piles so as to make them incline in a film advancing direction.

22 Claims, 6 Drawing Sheets

PHOTOGRAPHIC FILM CASSETTE WITH LIGHT-TRAPPING MEMBERS AND METHOD FOR TREATING LIGHT-TRAPPING MEMBERS

BACKGROUND OF THE INVENTION

1. Field of the Invention

The present invention relates to a photographic film cassette with light-trapping members and a method for treating light-trapping members, and more particularly to a photographic film cassette with light-trapping members wherein a leader of a photographic film is propelled out of a cassette shell by rotataion of a spool and a method for arranging piles of the light-trapping members.

2. Description of the Related Art

There are well-known photographic film cassettes wherein a spool is rotated in an unwinding direction so as to propel a leader of a photographic film, through a film passage mouth, to the outside of a cassette shell. In such photographic film cassettes, it is very important to reduce resistance of light-trapping members against the film leader in order to facilitate smooth advancement of the film leader to the outside of the film passage mouth. For this reason, a photographic film cassette with new light-trapping members has been proposed wherein the piles of the light-trapping members attached to a film passageway of a cassette shell are inclined toward a film passage mouth.

However, it is technically difficult to manufacture light-trapping members so that piles always have a predetermined constant inclination. A deviation of the inclination affects the thickness of the light-trapping members. If the thickness of the light-trapping members becomes too samll, ambient light would enter the cassette shell through the film passage mouth. If the thickness becomes large, the film propelling resistance increases. Also, when cutting the light-trapping members out of a web, dirt particles are yielded as tips of the piles being inclined are cut. Furthermore, it is necessary to attach the light-trapping members to the film passageway such that the inclination of the piles is directed toward the outside of the film passage mouth. This is difficult and time consuming.

SUMMARY OF THE INVENTION

It is an object of the present invention to provide a photographic film cassette and a method for treating light-trapping members wherein a leader of a photographic film can be propelled out of a cassette shell with a small torque.

It is another object of the present invention to provide a photographic film cassette and a method for treating light-trapping members which prevents ambient light invasion and the generation of dirt particles.

In order to achieve the above and other objects of the present invention, light-trapping members are attached to the upper and lower surfaces of a film passageway which is defined in a port portion of a cassette shell so that the tips of piles of the light-trapping members overlap each other at a predetermined depth. Subsequently, the cassette shell with the light-trapping members and the spool with the photographic film wound thereon are assembled to complete the photographic film cassette. After the assembly, and before being loaded into a camera, a leading end of the photographic film is once advanced through a film passageway out of a film passage mouth by rotation of the spool. Then, the spool is rotated in a winding direction so as to wind the leading end of the film again into the inside of the cassette shell. As a result, the tips of the piles of the light-trapping members are arranged so as to press against each other relative to the film moving direction.

In another preferred embodiment, after assembly, a sheet member is inserted from the film passage mouth into the film passageway and thereafter pulled out therefrom so that the tips of the piles of the light-trapping members are arranged so as to press against each other relative to the film advancing direction.

According to the present invention, it is possible to easily arrange the piles of light shielding members so that the leading end of the film is advanced out of the cassette shell with a small torque, while maintaining a sufficient light-trapping function.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 1:
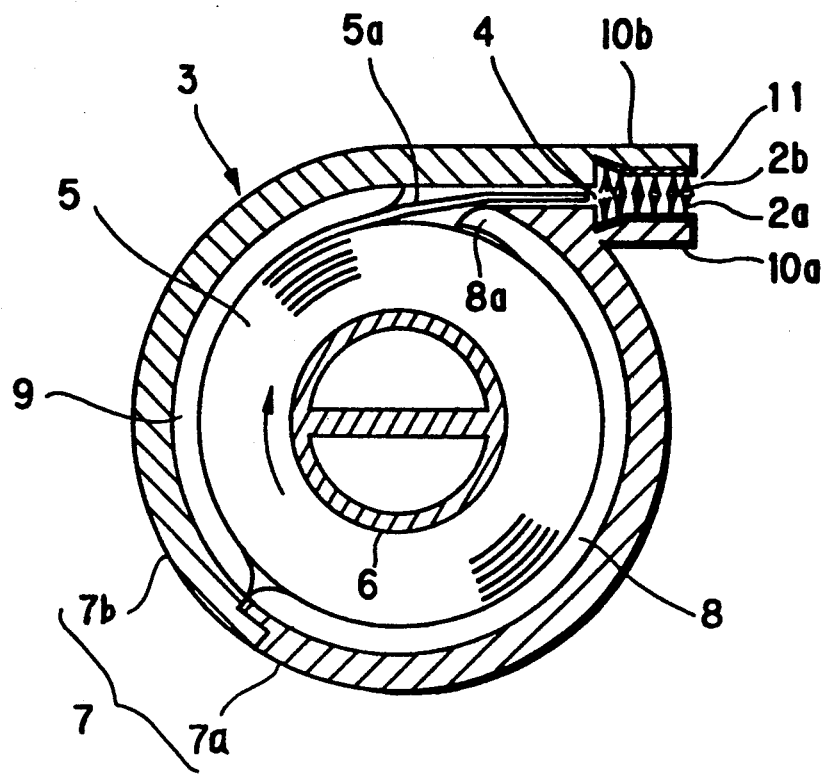
FIG. 1 is a cross section of a photographic film cassette with light-trapping members according to a first embodiment of the present invention.

Referring to FIG. 1, a photographic film cassette 3 has a cassette shell 7 constituted of shell halves 7a and 7b and a spool 6 with a photographic film 5 wound thereon. Annular ridges 8 and 9 are provided on the inner circumferential surfaces of the shell halves 7a and 7b to prevent the photographic film 5 from loosening. A separation claw 8a is formed on the end of the ridge 8 for separating a leading end 5a of the photographic film 5 from the outermost turn of the rolled photographic film 5. The respective shell halves 7a and 7b have channel-like port portions 10a and 10b. When the shell halves 7a and 7b are integrated, a film passageway 4 is formed by the port portions 10a and 10b.

Figure 4:
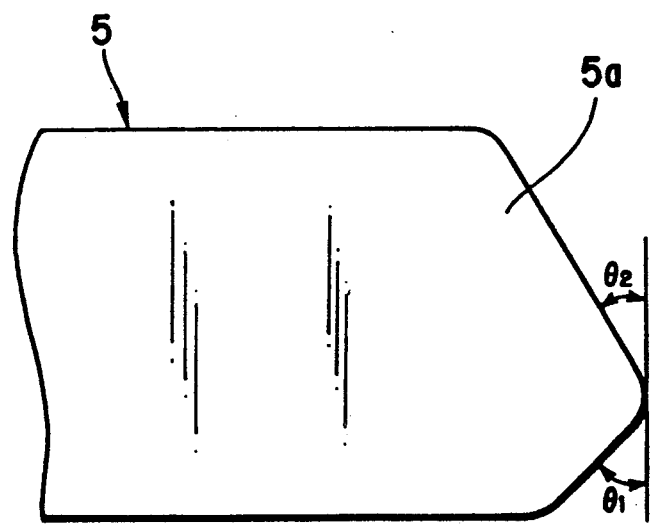
FIG. 4 illustrates the shape of the leading end of the photographic film.

Light-trapping members 2a and 2b are attached to the inside surfaces of the port portions 10a and 10b by an adhesive. A trailing end of the photographic film 5 is secured to the spool 6 and the leading end 5a thereof is cut in a shape illustrated in FIG. 4, in which angle $\theta_1$ and $\theta_2$ are e.g., 45° and 30° respectively.

The shell halves 7a and 7b and the spool 6 are molded of plastic. The light-trapping members 2a and 2b are attached to the shell halves 7a and 7b. After the spool 6, with the photographic film 5 wound thereon, is contained between the shell halves 7a and 7b, the shell halves 7a and 7b are adhered to each other by the ultrasonic welding.

Several embodiments and comparative examples will be discussed to describe the present invention in detail hereinafter.

Figure 2:
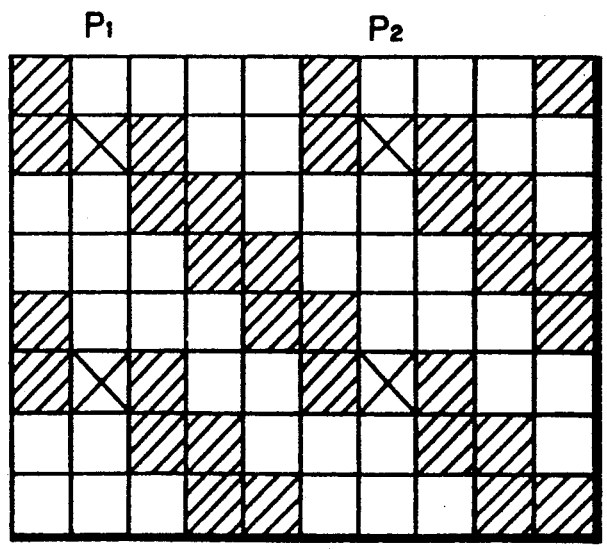
FIG. 2 illustrates a weave of the light-trapping members.

In the first embodiment, a velvet fabric was woven by a needle loom, having a weave construction as illustrated in FIG. 2, in which hatched cells show that warp threads overlie weft threads and blank cells show that weft threads overlie warp threads. Cross-hatched cells show that pile threads float over the weft threads. Each pile thread is inlaid in the vertical direction so that loops are formed between adjacent cells. In FIG. 2, only two pile threads $P_1$ and $P_2$ are illustrated and each loop of the pile threads $P_1$ and $P_2$ is cut at its center.

A nylon thread of 100 denier consisting of 48 filaments was used for pile threads. Two twisted antistatic nylon threads of 50 denier/10 filaments were used for warp threads while an antistatic nylon thread of 75 denier/24 filaments was used for weft threads. The woven velvet fabric was dyed with an acid dye and dried while being brushed so that piles of the velvet fabric were raised approximately perpendicularly. The velvet fabric was then cut by a predetermined size so as to obtain the light-trapping members 2a and 2b.

Figure 3:
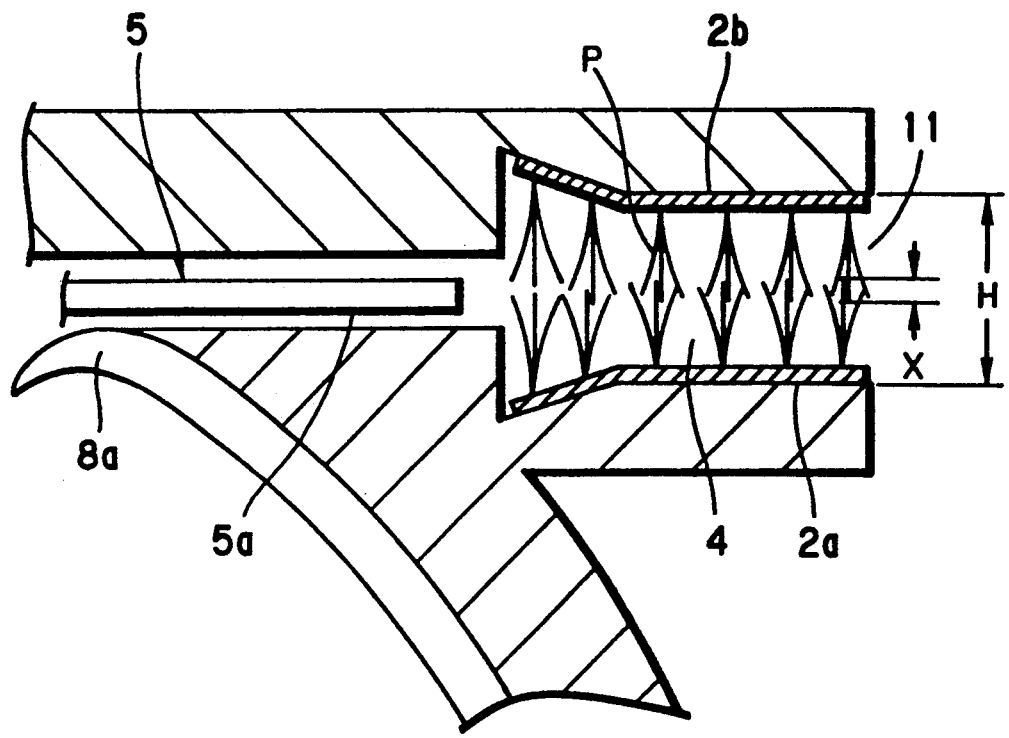
FIG. 3 is an enlarged cross section illustrating the state of the light-trapping members before a leading end of a photographic film is passed through a film passageway.

When attaching the light-trapping members 2a and 2b to the inside surfaces of the port portions 10a and 10b, a hot-melt adhesive mixed with a sticky type adhesive which exhibits the same stickiness at room temperature was utilized. Just after attachment, the piles P of the light-trapping members 2a and 2b were entangled alternately with each other, as illustrated in FIG. 3.

The SUPER HG 400 film (trade name: Fuji Photo Film Co., Ltd.) was used as a photographic film 5. As described above, the spool 6, with the photographic film 5 wound thereon, is interposed between the shell halves 7a and 7b, which are then assembled to form the photographic film cassette 3. A height H of the film passage mouth 11 was 2.3 mm. A thickness of the light-trapping members 2a and 2b which was measured by the Peacock thickness meter under a load of 5 g/cm$^2$ was 1.7 mm. At this time, a value X representing the collapsed amount of the pile threads P of each of the light-trapping members 2a and 2b was 0.55 mm.

Figure 5:
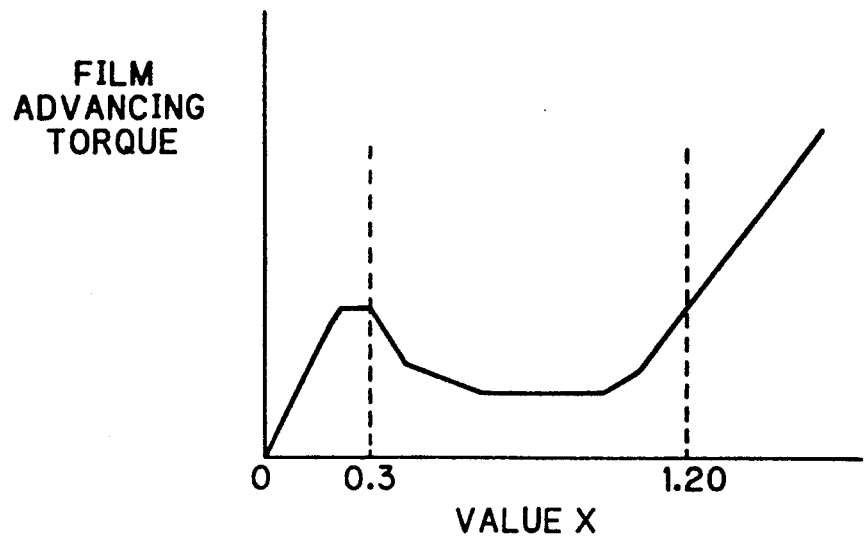
FIG. 5 is a graph illustrating the relationship between the value X and a film advancing torque.

As illustrated in FIG. 5, when the value X becomes smaller, an advancing torque becomes smaller, since the pile threads P tend to easily return to the initial alternately entangled condition. On the contrary, when the value X becomes larger under the condition that the thickness of the light-trapping members 2a and 2b is in a range from 1 mm to 3 mm, the advancing torque becomes rapidly larger at the value X of 1.20 mm or more. Accordingly, it is preferable to set the value X in a range from 0.3 mm to 1.2 mm. It is noted that the results of FIG. 5 were obtained in the following manner. The leading end 5a of the photographic film 5 contained in the cassette shell 7 was propelled through the film passage mouth 11 out of the cassette shell 7, and thereafter rewound so as to be contained therein. Then, the photographic film cassette 3 was subject to vibration at 10 Hz, and tested.

Figure 6:
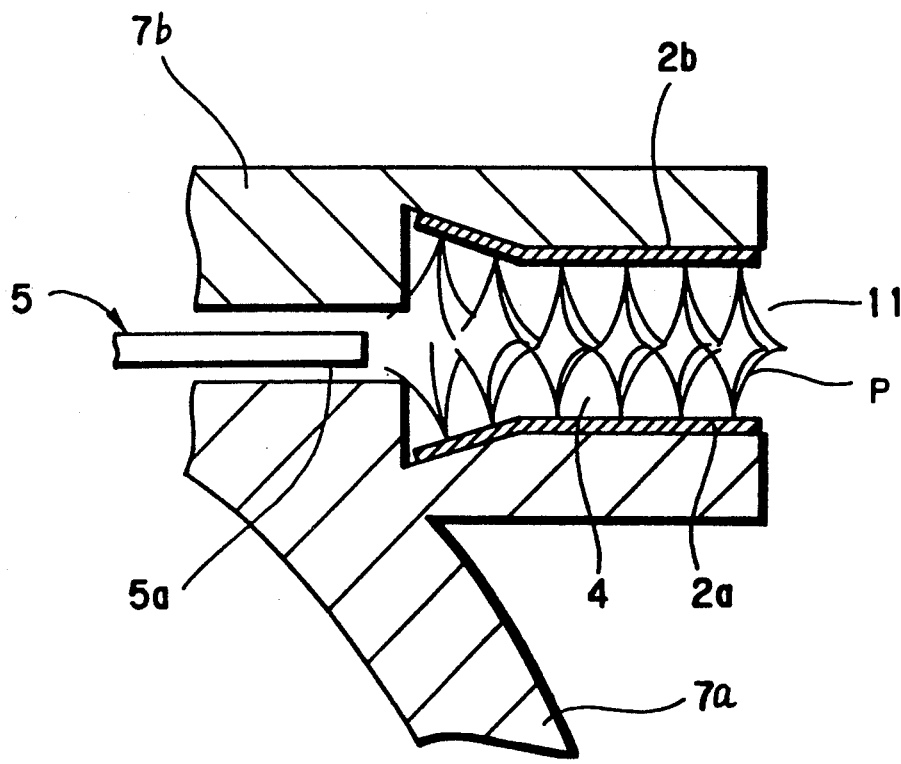
FIG. 6 is an enlarged cross section illustrating the state of the light-trapping members after the photographic film was passed in the film passageway.

The spool 6 of the photographic film cassette 3 was coupled with a shaft of a film winding device (not illustrated) having a large torque so as to rotate the spool 6 in a direction indicated by an arrow in FIG. 1 thereby to cause the leading end 5a of the photographic film 5 to exit through the film passageway 4 and the film passage mouth 11 to the outside of the cassette shell 7. Thereafter, the spool 6 was rotated in the opposite direction to wind the film 5 again so as to be contained, up to the leading end 5a, inside the cassette shell 7. As a result, the condition of the pile threads P changed from the state indicated in FIG. 3, wherein the respectively pile threads P of the light-trapping members 2a and 2b are entangled alternately, to a a state indicated in FIG. 6, wherein the respective tips of the pile threads P push against each other to incline in the film moving direction.

When the leading end 5a of the photographic film 5 advances through the film passageway 4, it pushes pile threads extending in the direction opposite to the film advancing direction toward the film width direction by the inclined edges of the leading end 5a. Therefore, the pile threads extending in the opposite direction will not greatly hinder the advancement of the leading end 5a.

Figure 7:
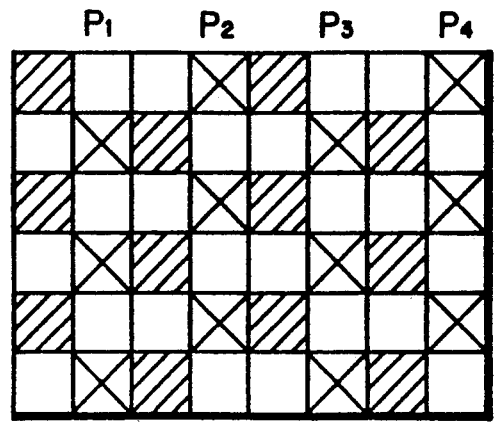
FIG. 7 illustrates a weave of light-trapping members according to a second embodiment of the present invention.
Figure 8:
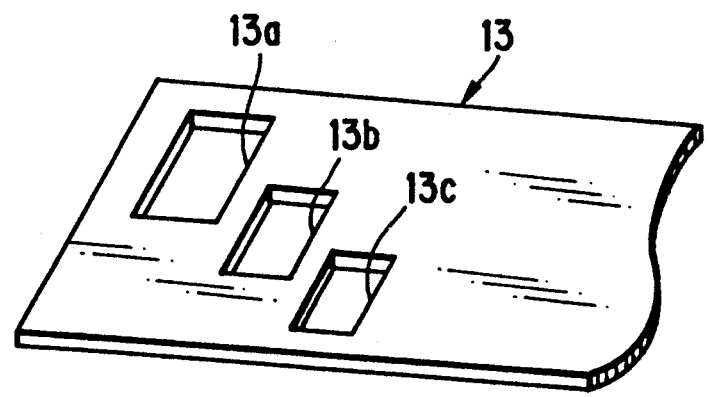
FIG. 8 is a perspective view of a sheet member with holes on its one end according to a third embodiment of the present invention which is inserted into and drawn from the film passageway.

A web was formed of a velvet fabric which was woven by a needle loom so as to have a weave construction according to a second embodiment as illustrated in FIG. 7. The pile, warp and weft threads of the light-trapping members 2a and 2b were a nylon thread of 100 denier/40 filaments, a rayon thread of 150 denier/24 filaments and a rayon thread of 120 denier/20 filaments respectively. The thickness of the light-trapping members 2a and 2b, the mouth height H and the value X were 1.8 mm, 2.3 mm and 0.65 mm respectively. The web was dyed, then dried while being brushed and cut at the predetermined size to obtain the light-trapping members 2a and 2b in the same manner as in the first embodiment. The light-trapping members 2a and 2b were then adhered to the shell halves 7a and 7b, which were then integrated to form the photographic film cassette 3. Thereafter, the pile threads were arranged by the above-mentioned unwinding and winding operations of the photographic film 5.

Figure 9:
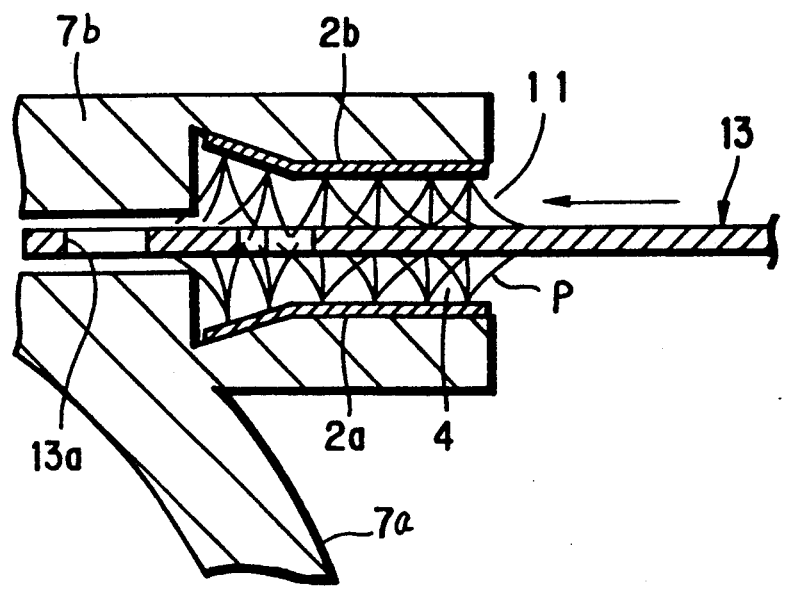
FIG. 9 is an enlarged view of the film passageway into which the sheet member is inserted.
Figure 10:
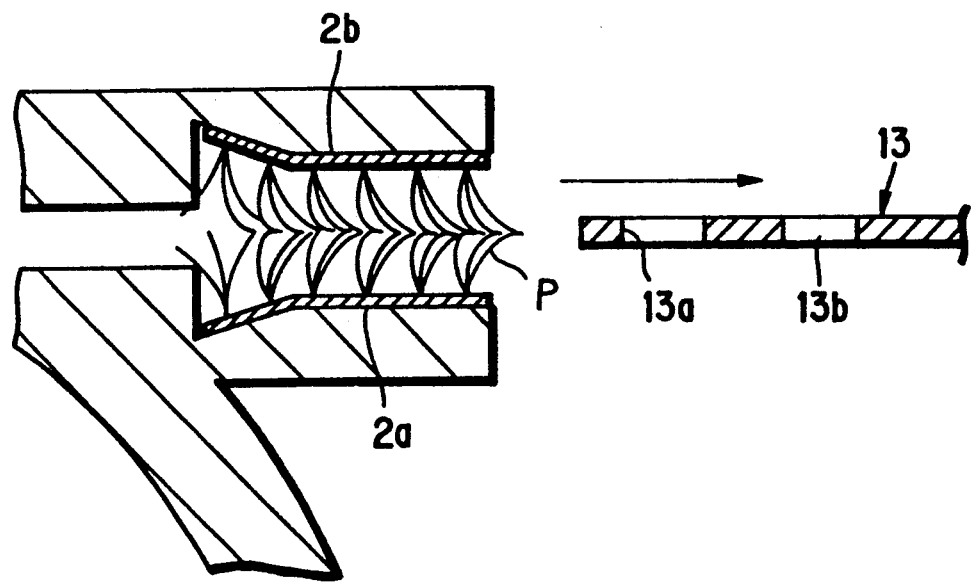
FIG. 10 is an enlarged view of the film passageway after the sheet member is drawn.

Similar to the first embodiment, the photographic film cassette 3, as shown in FIG. 1, was assembled. Next, a sheet member 13 was inserted from the film passage mouth 11 into the film passageway 4 as illustrated in FIG. 9 and drawn out therefrom. An end of the sheet member 13 has holes 13a to 13c formed therein for catching the pile threads P. The drawing of the sheet member 13 from the film passage mouth 11 causes the pile threads P of the light-trapping members 2a and 2b to be inclined toward the outside of the film passage mouth 11.

Figure 11:
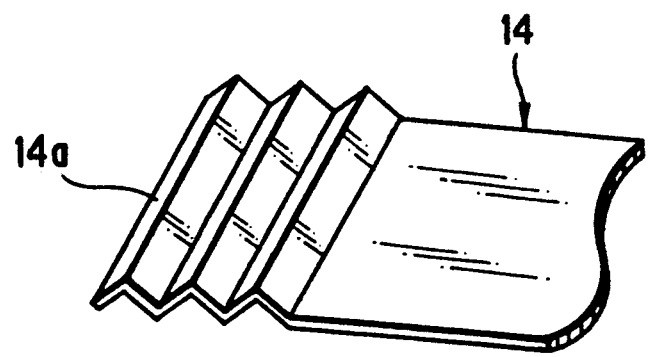
FIG. 11 is a perspective view of a sheet member with a corrugated end.
Figure 12:
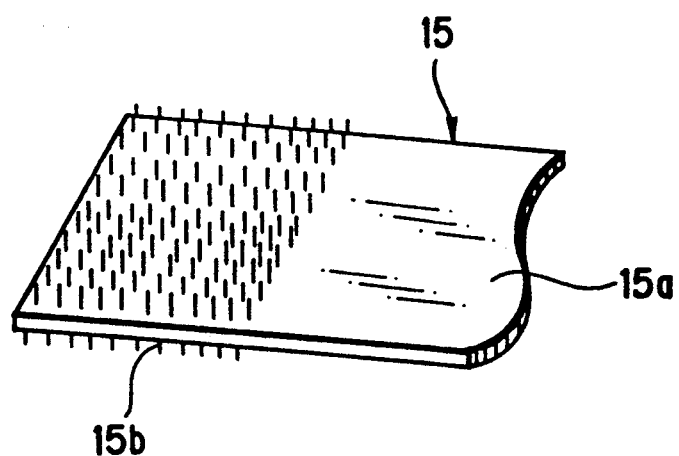
FIG. 12 is a perspective view of a sheet member with fillings on both surfaces of its one end.
Figure 13:
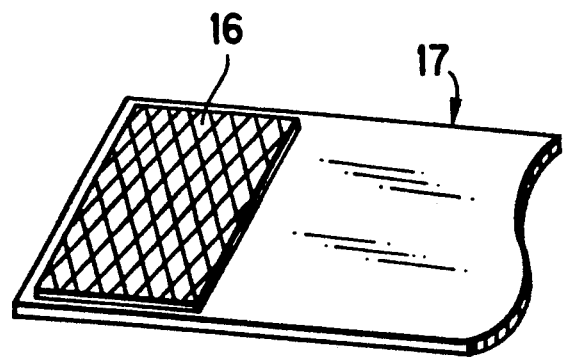
FIG. 13 is a perspective view of a sheet member with double-coated adhesive tapes attached on both surfaces of its one end.

In place of the sheet member 13, sheet members as illustrated in FIGS. 11 to 13 may be used. In FIG. 11, an end of a sheet member 14 has corrugations 14a so as to drag the pile threads P toward the film passage mouth 11. A sheet member 15 of FIG. 12 has fillings on both surfaces of its one end of a base 15a. A sheet member 17 of FIG. 13 has double-coated adhesive tape 16 attached to both surfaces of one end. The pile threads P are contacted by the sticky surfaces of the adhesive tapes during the drawing of the sheet member 17 and inclined toward the film passage mouth 11.

COMPARATIVE EXAMPLE 1

The light-trapping members 2a and 2b the same as in the first embodiment were attached to a photographic film cassette having a mouth height of 2.6 mm. The thickness of the light-trapping members 2a and 2b and the value X were 1.7 mm and 0.4 mm respectively. The leading end 5a of the photographic film 5 was not preliminarily projected out of the photographic film cassette. The arrangement condition of the pile threads P was the same as in FIG. 3.

COMPARATIVE EXAMPLE 2

A photographic film cassette similar in structure to the first embodiment was constructed. However, the leading end 5a of the photographic film 5 contained in the film cassette was not preliminarily projected out of the photographic film cassette.

In each photographic film cassette of the three embodiments and the Comparative Examples 1 and 2, an advancing torque was measured as shown in Table 1 when advancing the leading end 5a of the film 5 through the film passage mouth 11 out of the cassette shell 7 by rotation of the spool 6. An advancing torque after subjecting each cassette to vibrations of 10 Hz for one hour was also measured.

TABLE 1

|  |  | Value X | Advancing Torque (g.cm) | Advancing Torque after Vibrations (g.cm) |
|---|---|---|---|---|
| Example | 1 | 0.55 | 220 | 230 |
|  | 2 | 0.65 | 180 | 200 |
|  | 3 | 0.55 | 205 | 220 |
| Comparative Example | 1 | 0.40 | 450 | 540 |
| Comparative Example | 2 | 0.55 | 750 | 800 |

As is apparent in the Table 1, the respective advancing torques of the first to third embodiments were small and were not substantially increased even when measured after the vibration period. In fact, entanglement and twisting of the pile threads P was not observed after the vibrations. On the contrary, in the Comparative Examples 1 and 2, the advancing torques were relatively high. Therefore, it is expected that the leading end 5a could not be propelled through the film passage mouth 11 out of the cassette shell 7 in a camera with a drive shaft capable of imparting only a small advancing torque or a camera having decreased electric power.

In order to perform the initial advancement of the leading end 5a of the photographic film 5 to the outside of the cassette shell 7 in a camera smoothly and securely, it is necessary to limit the advancing torque. For this reason, it is necessary to conduct the testing of the advancing torque for the photographic film cassette 3 after assembling. This testing process can be combined with the process of the example 1 for arranging the piles of the light-trapping members. At this time, it is preferable to repeat the advancement of the leading end 5a of the photographic film 5 through the film passageway 4 out of the cassette shell 7 twice in order to measure the advancing torque at the second time since the advancing torque is reduced the second time. Therefore, the exact arrangement control is performed the second time. Also, if a lubricant such as silicon is applied to the pile areas, a friction coefficient between the pile threads of the light-trapping members 2 can be lowered to reduce the advancing torque at the first time.

Although the present invention has been described as above with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A method for treating two light-trapping members of a photographic film cassette including a cassette shell, a spool and a photographic film wound on said spool, a leading end of said photographic film being propelled out of said cassette shell in a first direction through a film passageway formed in said cassette shell by rotation of said spool, said method comprising the steps of:
   attaching said light-trapping members to upper and lower surfaces of said film passageway, said light-trapping members having piles;
   assembling said cassette shell with said light-trapping members to contain said spool with said photographic film wound thereon, so that tips of said piles overlap each other to a predetermined depth; and
   arranging substantially all of said tips of said piles so as to push against each other and so as to cause said tips to be inclined so as to extend in said first direction.

2. A method as defined in claim 1, wherein said cassette shell consists of two shell halves.

3. A method as defined in claim 2, wherein said leading end of said photographic film is cut in a V-shape, so that the leading end of said photographic film disperses some of said piles which are inclined toward the inside of said cassette shell in a direction transverse to said first direction when said photographic film is advanced out of said cassette shell.

4. A method as defined in claim 2, wherein said arranging step is performed by preliminarily advancing said leading end out of said cassette shell through said film passageway by rotation of said spool and subsequently winding said film back into said cassette shell.

5. A method as defined in claim 2, wherein said arranging step is performed by inserting a sheet member into said film passageway and subsequently removing said sheet member so as to incline said piles in a first direction.

6. A method as defined in claim 5, wherein one end of said sheet member has a plurality of holes formed therein so as to engage with said piles.

7. A method as defined in claim 5, wherein one end of said sheet member has corrugations formed thereon so as to engage with said piles.

8. A method as defined in claim 5, wherein said sheet member has projections formed on both surfaces of one end thereof so as to engage with said piles.

9. A method as defined in claim 5, wherein said sheet member has double-coated adhesive tape attached to both surfaces of one end thereof so as to catch said piles.

10. A method for treating two light-trapping members of a photographic film cassette including a cassette shell, a spool and a photographic film wound on said spool, a leading end of said photographic film being propelled out of said cassette shell in a first direction through a film passageway formed in said cassette shell by rotation of said spool, said method comprising the steps of:

attaching said light-trapping members to upper and lower surfaces of said film passageway so that tips of piles of said light-trapping members overlap each other to a predetermined depth; and arranging all of said tips of said piles, when assembling said cassette shell to contain said spool with said photographic film wound thereon, so as to cause said tips of said piles to push against each other and be inclined in said first direction by inserting a sheet member into said film passageway and subsequently drawing said sheet member from said film passageway.

11. A method as defined in claim 10, wherein said cassette shell consists of two shell halves.

12. A method as defined in claim 11, wherein one end of said sheet member has a plurality of holes formed therein so as to engage with said piles.

13. A method as defined in claim 11, wherein one end of said sheet member has corrugations formed thereon so as to engage with said piles.

14. A method as defined in claim 11, wherein said sheet member has projections formed on both surfaces of its one end thereof so as to engage with said piles.

15. A method as defined in claim 11, wherein said sheet member has double-coated adhesive tapes attached to both surfaces of one end thereof so as to catch said piles.

16. A method as defined in claim 11, wherein said light-trapping members are a velvet fabric.

17. A photographic film cassette including a cassette shell, a spool and a roll of a film wound on said spool, a leading end of said photographic film being propelled out of said cassette shell in a first direction through a film passageway formed in said cassette shell by rotation of said spool, said photographic film cassette comprising:

a pair of light-trapping members attached to upper and lower surfaces of said film passageway, said light-trapping members having piles, tips of substantially all of said piles being arranged so as to push against each other and be inclined in said first direction.

18. A photographic film cassette as defined in claim 17, wherein said cassette shell consists of two shell halves.

19. A photographic film cassette as defined in claim 18, wherein said leading end of said photographic film is propelled through said film passageway out of said cassette shell and subsequently wound back into the inside of said cassette shell so as to arrange said tips of said piles.

20. A photographic film cassette as defined in claim 19, wherein said leading end of said photographic film is cut in a V-shape so that said leading end disperses some of said piles, which are inclined toward an inside of said cassette shell, in a direction transverse to said first direction when advancing said photographic film out of said cassette shell.

21. A photographic film cassette as defined in claim 20, wherein said light-trapping members are formed of a velvet fabric.

22. A photographic film cassette as defined in claim 21, wherein a lubricant is applied to said piles of said light-trapping members so as to decrease frictional coefficients between said light-trapping members and both surfaces of said photographic film.

* * * * *